(12) United States Patent
Lindemann et al.

(10) Patent No.: US 9,303,700 B2
(45) Date of Patent: Apr. 5, 2016

(54) TURBINE PISTON THRUST PATH

(71) Applicant: SCHAEFFLER TECHNOLOGIES AG & CO. KG, Herzogenaurach (DE)

(72) Inventors: Patrick Lindemann, Wooster, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/043,882

(22) Filed: Oct. 2, 2013

(65) Prior Publication Data

US 2014/0097055 A1 Apr. 10, 2014

Related U.S. Application Data

(60) Provisional application No. 61/709,622, filed on Oct. 4, 2012.

(51) Int. Cl.
 F16H 45/02 (2006.01)
 F16D 33/18 (2006.01)
 F16H 41/24 (2006.01)
 F16D 47/06 (2006.01)

(52) U.S. Cl.
 CPC .............. F16D 33/18 (2013.01); F16H 41/24 (2013.01); F16H 45/02 (2013.01); F16D 47/06 (2013.01); F16H 2045/0205 (2013.01); F16H 2045/0221 (2013.01); F16H 2045/0226 (2013.01); F16H 2045/0278 (2013.01)

(58) Field of Classification Search
 CPC ............................................. F16H 2045/0221
 See application file for complete search history.

(56) References Cited

U.S. PATENT DOCUMENTS

| 6,012,558 | A  | * | 1/2000  | Kundermann ............... 192/3.29 |
| 6,056,093 | A  |   | 5/2000  | Hinkel |
| 6,494,303 | B1 | * | 12/2002 | Reik et al. .................... 192/3.29 |
| 6,622,834 | B2 | * | 9/2003  | Bornschier et al. .......... 192/3.29 |
| 7,445,099 | B2 |   | 11/2008 | Maucher et al. |

(Continued)

FOREIGN PATENT DOCUMENTS

| DE | 19754650 A1 | 6/1999 |
| EP | 1211438 A3  | 6/2002 |

(Continued)

OTHER PUBLICATIONS

International Search Report for PCT/EP2013/070068, 9 pgs, mailed Jan. 3, 2014 by the European Patent Office.

*Primary Examiner* — Robert Hodge
*Assistant Examiner* — Stacey Fluhart
(74) *Attorney, Agent, or Firm* — Kathryn A. Warner

(57) ABSTRACT

A torque converter includes a torus with an impeller and a turbine having respective shells, a cover shell, and a first damper plate. The impeller shell has a radial wall disposed radially outside of the torus and the turbine shell has a radial wall arranged for frictionally engaging the impeller shell radial wall. The cover shell has a radial wall and the first damper plate has a radial wall for transmitting a turbine shell thrust force to the cover shell radial wall. In an example embodiment, the torque converter includes a friction material ring fixedly attached to the turbine shell radial wall or the impeller shell radial wall. In some example embodiments, the torque converter includes a friction material ring fixedly attached to the cover shell radial wall or the first damper plate radial wall.

11 Claims, 4 Drawing Sheets

(56) References Cited

U.S. PATENT DOCUMENTS

| | | | |
|---|---|---|---|
| 8,348,036 B2 * | 1/2013 | Ari et al. | 192/3.3 |
| 2006/0086584 A1 * | 4/2006 | Maucher et al. | 192/3.29 |
| 2013/0230385 A1 | 9/2013 | Lindemann et al. | |

FOREIGN PATENT DOCUMENTS

| | | |
|---|---|---|
| JP | 2004332801 A2 | 11/2004 |
| JP | 2011069464 A2 | 4/2011 |
| WO | 2013130398 A1 | 9/2013 |

* cited by examiner

TURBINE PISTON THRUST PATH

FIELD

The invention relates generally to a torque converter, and more specifically to a torque converter with a turbine piston thrust path.

BACKGROUND

Torque converter turbines incorporating lockup clutches are known. One example is shown in commonly-assigned U.S. Pat. No. 7,445,099.

BRIEF SUMMARY

Example aspects broadly comprise a torque converter including a torus with an impeller and a turbine having respective shells, a cover shell, and a first damper plate. The impeller shell has a radial wall disposed radially outside of the torus and the turbine shell has a radial wall arranged for frictionally engaging the impeller shell radial wall. The cover shell has a radial wall and the first damper plate has a radial wall for transmitting a turbine shell thrust force to the cover shell radial wall. In an example embodiment, the torque converter includes a friction material ring fixedly attached to the turbine shell radial wall or the impeller shell radial wall. In some example embodiments, the torque converter includes a friction material ring fixedly attached to the cover shell radial wall or the first damper plate radial wall. In an example embodiment, the friction material ring is fixedly attached to the first damper plate radial wall and the first damper plate includes an orifice disposed radially inside of the friction material ring.

In some example embodiments, the first damper plate includes a spline portion arranged for connecting to a transmission input shaft. In some example embodiments, the first damper plate includes a damper hub, the damper hub includes the spline portion, and the damper hub is arranged to receive a thrust force from the turbine shell. In an example embodiment, the torque converter has a bushing with a circumferential portion disposed within a circumferential bore of the turbine shell and a radial portion disposed between the turbine shell and the damper hub. In some example embodiments, the torque converter has a first damper spring. The turbine shell includes an integrally formed drive tab extending from the radial wall and engaged with the first damper spring. In some example embodiments, the torque converter has a second damper plate. The second damper plate is fixed to the first damper plate, the first and second damper plates include respective integrally-formed spring retainer portions, and the first damper spring is disposed within the first and second damper plate spring retainer portions.

In some example embodiments, the torque converter has a third damper plate and a second damper spring. The third damper plate includes a spline portion arranged for connecting to a transmission input shaft, a spring window, and an orifice disposed radially inside of the spring window. The second damper spring is disposed within respective spring windows of the first, second, and third damper plates. The third damper plate is disposed between the first and second damper plates, and the third damper plate is arranged for transmitting a thrust force from the turbine shell to the first damper plate. In an example embodiment, the torque converter has a bushing with a circumferential portion disposed within a circumferential bore of the turbine shell and a radial portion disposed between the turbine shell and the third damper plate.

Other example aspects broadly comprise a torque converter including a a torus including an impeller and a turbine with respective shells, a clutch plate, a cover shell, and a first damper plate. The impeller shell has a radial wall disposed radially outside of the torus. The clutch plate is fixed to the turbine shell and includes a radial wall arranged for frictionally engaging the impeller shell radial wall. The cover shell has a a radial wall and the first damper plate has a radial wall for transmitting a turbine shell thrust force to the cover shell radial wall. In an example embodiment, the torque converter has a friction material ring fixedly attached to the clutch plate radial wall or the impeller shell radial wall. In an example embodiment, the torque converter has a friction material ring fixedly attached to the cover shell radial wall or the first damper plate radial wall.

In some example embodiments, the torque converter has a first damper spring. The clutch plate includes a circumferential wall radially aligned with the first damper spring. In some example embodiments, the clutch plate radial and circumferential walls form at least a portion of an integrally-formed spring retainer portion and the first damper spring is disposed within the first damper plate spring retainer portion. In some example embodiments, the torque converter includes second and third damper plates. The second damper plate is fixed to the clutch plate and includes a first drive tab at least partially axially aligned with the clutch plate radial wall and engaged with the first damper spring. The third damper plate is fixed to the first damper plate and includes a second drive tab at least partially axially aligned with the clutch plate radial wall and engaged with the first damper spring.

In some example embodiments, the torque converter has a second damper spring disposed within respective spring windows of the first and third damper plates, and a fourth damper plate disposed between the first and third damper plates and arranged for transmitting a thrust force from the turbine shell to the first damper plate. In an example embodiment, the fourth damper plate includes a spring window, the second damper spring is disposed within the fourth damper plate spring window, and the fourth damper plate includes an orifice disposed radially inside of the spring window. In an example embodiment, the torque converter has a bushing with a circumferential portion disposed within a circumferential bore of the turbine shell and a radial portion disposed between the turbine shell and the fourth damper plate.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
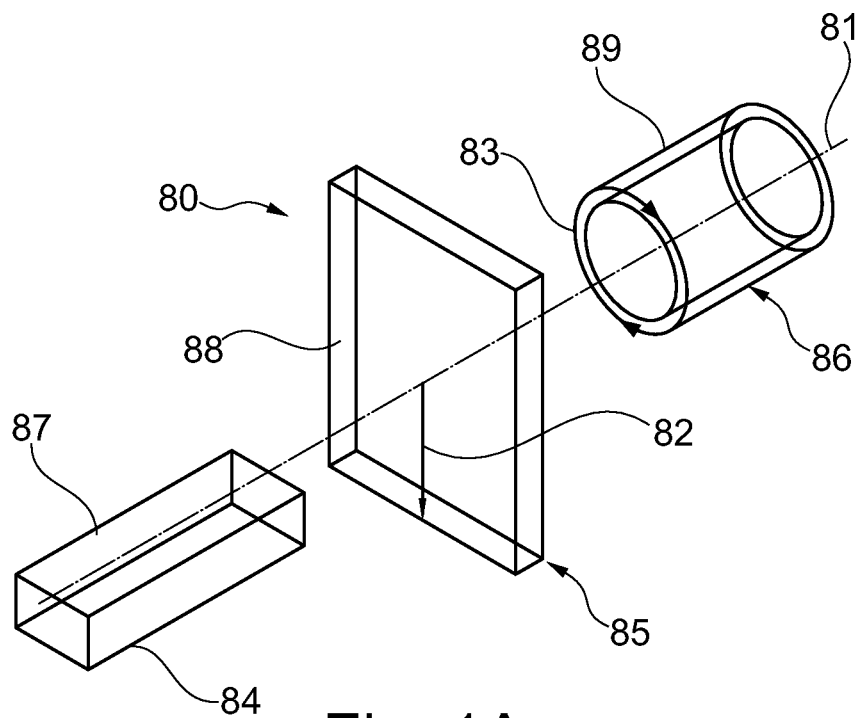
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
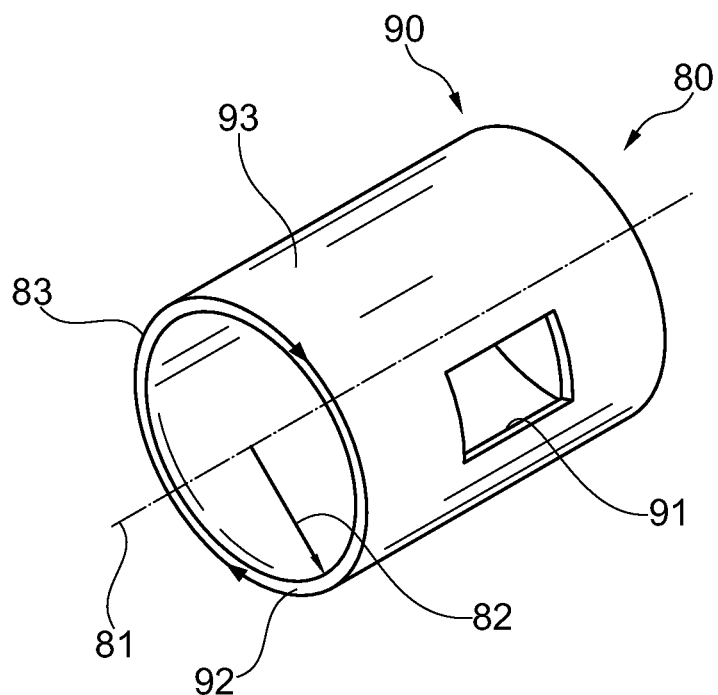
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
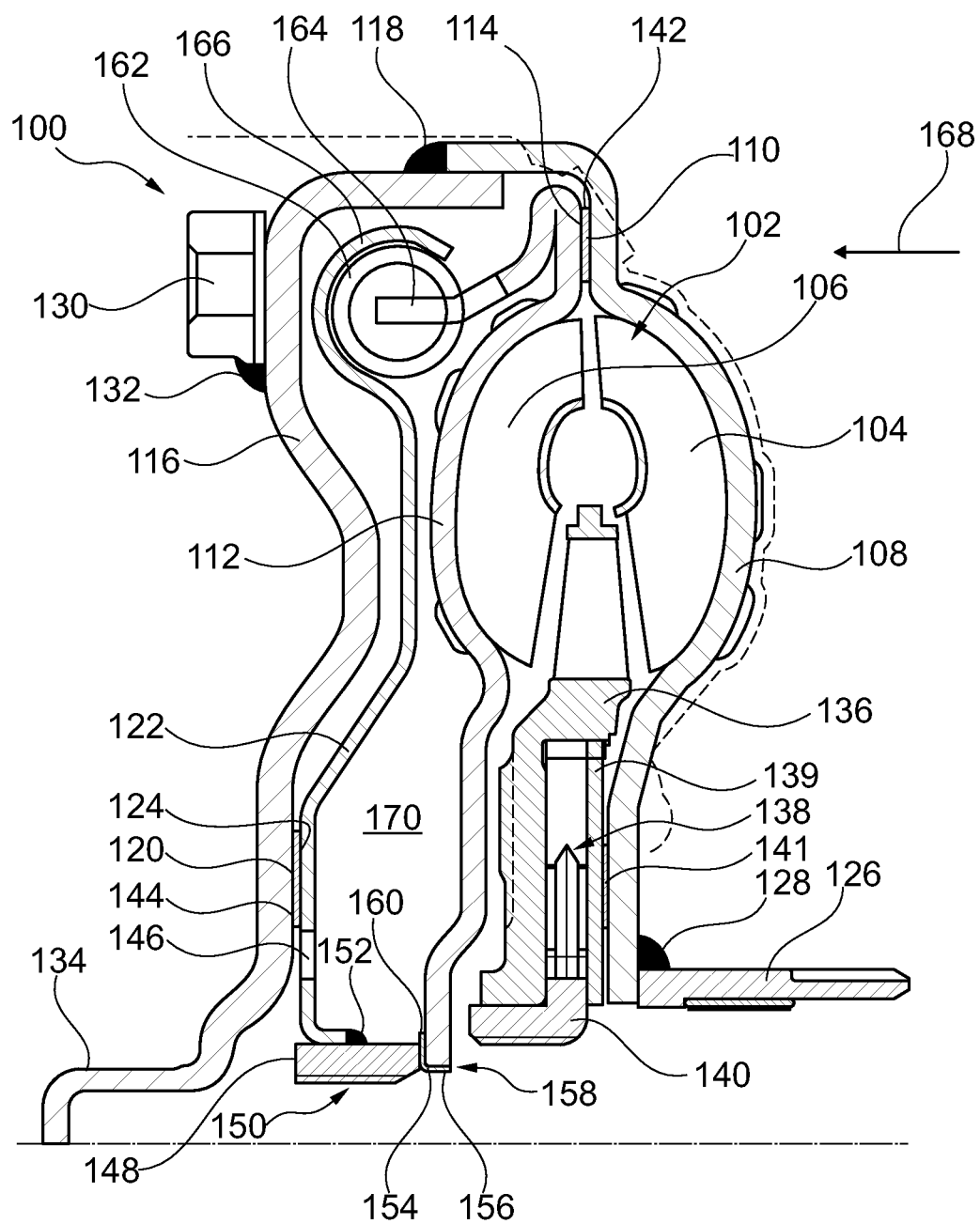
FIG. 2 is a cross section view of a torque converter with a turbine piston thrust path according to an example aspect.

The following description is made with reference to FIG. 2. FIG. 2 is a cross section view of torque converter 100 with a turbine piston thrust path according to an example aspect. Torque converter 100 includes torus 102 with impeller 104 and turbine 106. Impeller shell 108 includes radial wall 110 disposed radially outside of torus 102, and turbine shell 112 includes radial wall 114 arranged for frictionally engaging impeller shell radial wall 110 as described below. Cover shell 116, fixed to impeller shell 108 at weld 118, includes radial wall 120. Damper plate 122 includes radial wall 124 for transmitting a turbine shell thrust force to cover shell radial wall 120 as described below.

Impeller shell 108 includes hub 126 fixed to shell 108 by weld 128. Hub 126 is for interfacing with a transmission (not shown). Cover shell 116 includes lug 130 fixed to shell 116 by weld 132 and integrally formed pilot area 134. Lug 130 and pilot 134 are for interfacing with an engine (not shown). Lug 130 may be fixed to a flexplate attached to an engine crankshaft, for example. Pilot 134 may center converter 100 relative to the crankshaft, for example. Stator 136 includes wedge one way clutch assembly 138 with inner race 140 for interfacing with a transmission stator shaft (not shown) and side plate 139 with friction material ring 141, fixedly attached to side plate 139 by adhesive bonding, for example, for transmitting a turbine and/or stator thrust load to the impeller.

Friction material ring 142 is fixedly attached to the turbine shell radial wall by adhesive bonding, for example. Although ring 142 is shown fixed to radial wall 114, other embodiments (not shown) may include ring 142 fixed to radial wall 110. Friction material ring 144 is fixedly attached to radial wall 124 by adhesive bonding, for example. Although ring 144 is shown fixed to radial wall 124, other embodiments (not shown) may include ring 144 fixed to radial wall 120. Plate 122 includes orifice 146 disposed radially inside of the friction material ring. Plate 122 includes damper hub 148 with spline portion 150 arranged for connecting to a transmission input shaft (not shown). Although hub 148 is shown fixed to plate 122 by weld 152, other embodiments of plate 122 (not shown) may include an integrally formed hub with spline portion. Hub 148 receives the thrust force from turbine shell 112 as described below.

Converter 100 includes bushing 154 with circumferential portion 156 disposed within circumferential bore 158 of turbine shell 112, and radial portion 160 disposed between the turbine shell and damper hub 148. Portion 156 is for sealing shell 112 to a transmission input shaft (not shown).

Converter 100 includes damper spring 162. Turbine shell 112 includes integrally formed drive tab 164. Tab 164 extends from radial wall 114 and is engaged with damper spring 162. Damper plate 122 includes integrally-formed spring retainer portion 166. Spring 162 is disposed within spring retainer portion 166. Plate 122 also includes a spring driving portion (not shown in the section cut of FIG. 2) so that torque from shell 112 is transmitted from tab 164 through spring 162 to the spring driving portion of plate 122. Spring 162 advantageously provides damping to converter 100 so that torsional vibrations from the engine are at least partially isolated from the transmission.

During operation of converter 100, turbine 106 may thrust in direction 168 towards cover shell 116. Thrust force from the turbine is transmitted from shell 112, through bushing 154 to hub 148, plate 122, and ring 144 to wall 120 of shell 116. This thrust path advantageously limits axial displacement of shell 112 to control "liftoff", or an axial gap, between ring 142 and impeller shell 108, improving engagement characteristics of the friction interface, or clutch, between radial walls 114 and 110. Ring 144 advantageously prevents metal-on-metal (or steel-on-steel) contact between plate 122 and shell 116.

Pressure in chamber 170, disposed between cover 116 and turbine shell 112 may be increased above a pressure in torus 102 to engage the clutch and bypass the torus fluid circuit. That is, torque from cover 116 transmitted to torus 108 is directly transmitted to turbine shell 112 without operation of the fluid circuit. Depending on the operating condition of converter 100 prior to an attempted engagement of the clutch, imprecise control of liftoff may prevent clutch engagement due to hydrodynamic forces within the converter.

Figure 3:
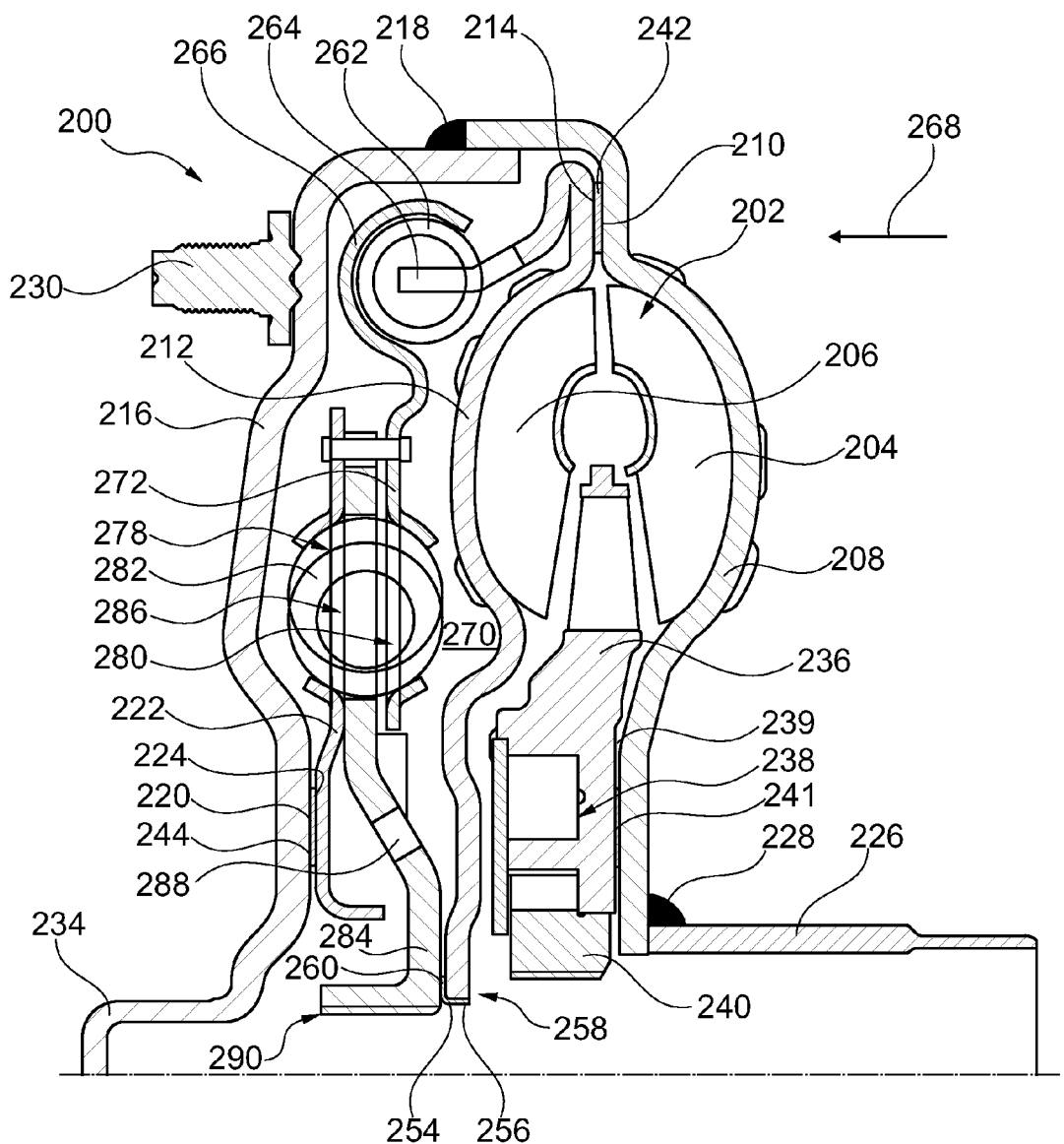
FIG. 3 is a cross section view of a torque converter with a turbine piston thrust path according to an example aspect.
Figure 4:
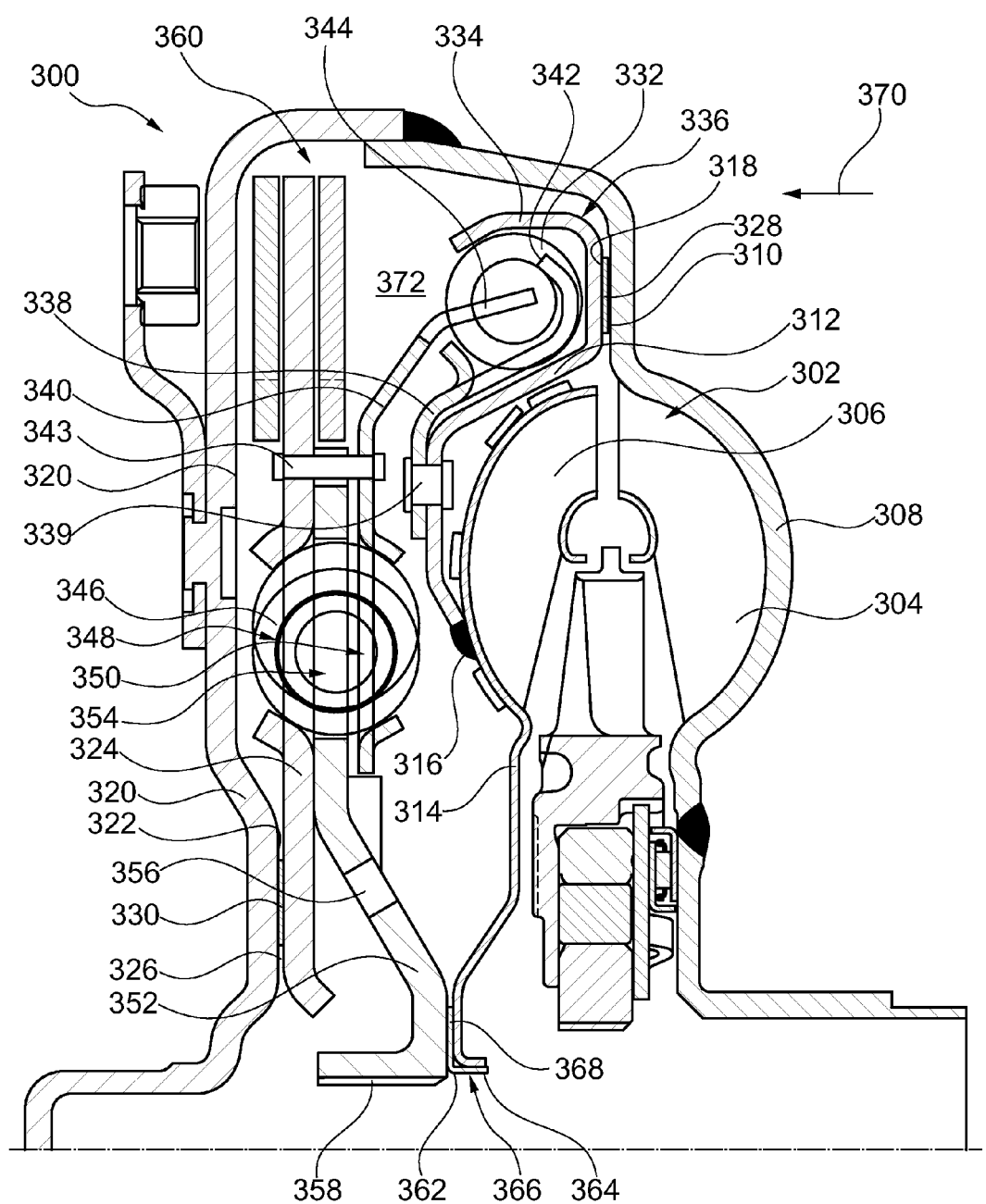
FIG. 4 is a cross section view of a torque converter with a turbine piston thrust path according to an example aspect.

The following description is made with reference to FIG. 3. FIG. 3 is a cross section view of torque converter 200 with a turbine piston thrust path according to an example aspect. Torque converter 200 includes torus 202 with impeller 204 and turbine 206. Impeller shell 208 includes radial wall 210 disposed radially outside of torus 202, and turbine shell 212 includes radial wall 214 arranged for frictionally engaging impeller shell radial wall 210 in a manner similar to walls 110 and 114 described above. Cover shell 216, fixed to impeller shell 208 at weld 218, includes radial wall 220. Damper plate 222 includes radial wall 224 for transmitting a turbine shell thrust force to cover shell radial wall 220 similar to walls 124 and 120 described above.

Impeller shell 208 includes hub 226 fixed to shell 208 by weld 228. Hub 226 is for interfacing with a transmission (not shown). Cover shell 216 includes stud 230 fixed to shell 216 by a projection weld, for example, and integrally formed pilot area 234. Stud 230 and pilot 234 are for interfacing with an engine (not shown). Stud 230 may be fixed to a flexplate attached to an engine crankshaft, for example. Pilot 234 may center converter 200 relative to the crankshaft, for example. Stator 236 includes one way clutch assembly 238 with inner race 240 for interfacing with a transmission stator shaft (not shown). Stator 236 includes radial wall 239 with friction material ring 241, fixedly attached to wall 239 by adhesive bonding, for example, for transmitting a turbine and/or stator thrust load to the impeller.

Friction material ring 242 is fixedly attached to the turbine shell radial wall by adhesive bonding, for example. Although ring 242 is shown fixed to radial wall 214, other embodiments (not shown) may include ring 242 fixed to radial wall 210. Friction material ring 244 is fixedly attached to radial wall 224 by adhesive bonding, for example. Although ring 244 is shown fixed to radial wall 224, other embodiments (not shown) may include ring 244 fixed to radial wall 220.

Converter 200 includes damper spring 262. Turbine shell 212 includes integrally formed drive tab 264. Tab 264 extends from radial wall 214 and is engaged with damper spring 262. Converter 200 includes damper plate 272 including integrally formed spring retainer portion 274. Plate 272 is fixed to plate 222 by sheet metal rivet 276. Although plates 222 and 272 are shown fixed together by riveting, other methods such as welding may be used to fix the plates together. Spring 262 is disposed within the spring retainer portion 266. Plate 272 also includes a spring driving portion (not shown in the section cut of FIG. 3) so that torque from shell 212 is transmitted from tab 264 through spring 262 to the spring driving portion to plate 222.

Plates 222 and 272 include respective spring windows 278 and 280. Spring 282 is at least partially disposed within window 278 and 280. That is, the spring is at least partially retained within the windows. Converter 200 includes damper plate 284 disposed between plates 222 and 272. Plate 284 is arranged for transmitting a thrust force from the turbine shell to damper plate 222 as described below. Plate 284 includes spring window 286. Spring 282 is at least partially disposed within window 286. Springs 262 and 282 advantageously provide damping so that torsional vibrations from the engine are at least partially isolated from the transmission.

Plate 284 includes orifice 288 disposed radially inside of the spring window and spline portion 290 arranged for connecting to a transmission input shaft. Converter 100 includes bushing 254 with circumferential portion 256 disposed within circumferential bore 258 of turbine shell 212, and radial portion 260 disposed between the turbine shell and damper plate 284. Portion 256 is for sealing shell 112 to a transmission input shaft (not shown).

During operation of converter 200, turbine 206 may thrust in direction 268 towards cover shell 216. Thrust force from the turbine is transmitted from shell 212, through bushing 254 to plate 284, plate 222, and ring 244 to wall 220 of shell 216. This thrust path advantageously limits axial displacement of shell 212 to control "liftoff" as described above.

Pressure in chamber 270, disposed between cover 216 and turbine shell 212 may be increased above a pressure in torus 202 to engage the clutch and bypass the torus fluid circuit. That is, torque from cover 216 transmitted to torus 208 is directly transmitted to turbine shell 212 without operation of the fluid circuit. Depending on the operating condition of converter 200 prior to an attempted engagement of the clutch, imprecise control of liftoff may prevent clutch engagement due to hydrodynamic forces within the converter.

Torque converter 300 includes torus 302 with impeller 304 and turbine 306. Impeller shell 308 includes radial wall 310 disposed radially outside of the torus. Clutch plate 312 is fixed to turbine shell 314 at weld 316, for example, and includes radial wall 318 arranged for frictionally engaging the impeller shell radial wall. Cover shell 320 includes radial wall 322 and damper plate 324 includes radial wall 326 for transmitting a turbine shell thrust force to the cover shell radial wall. Friction material ring 328 is fixedly attached by bonding, for example, to clutch plate radial wall 318. In other embodiments (not shown), ring 328 may be fixed to impeller shell radial wall 310. Friction material ring 330 is fixedly attached to damper plate radial wall 326. In other embodiments (not shown), ring 330 is fixed to cover shell radial wall 322.

Converter 300 includes damper spring 332 and clutch plate 312 includes circumferential wall 334 radially aligned with the first damper spring. In an example embodiment, walls 318 and 334 form at least a portion of integrally-formed spring retainer portion 336 and damper spring 332 is disposed within retainer portion 336. Converter 300 includes damper plates 338 and 340. Plate 338 is fixed to clutch plate 312 at rivet 339, for example, and includes drive tab 342 at least partially axially aligned with clutch plate radial wall 318. Tab 342 is engaged with damper spring 332. Plate 340 is fixed to plate 324 by sheet metal rivet 343, for example, and includes drive tab 344 at least partially axially aligned with the clutch plate radial wall and engaged with damper spring 332.

Converter 300 includes damper spring 346 at least partially disposed within respective spring windows 348 and 350 of damper plates 324 and 340. Damper plate 352, disposed between plates 324 and 340, is arranged for transmitting a thrust force from the turbine shell to damper plate 324 in a manner similar to plate 284 described above. Plate 352 includes spring window 354, orifice 356 disposed radially inside of window 354, and spline portion 358 arranged for connecting to a transmission input shaft. Spring 346 is at least partially disposed within window 354. In an example embodiment, converter 300 includes pendulum damper 360 fixed to damper plate 324 as is commonly known in the art.

Bushing 362 has circumferential portion 364 disposed within circumferential bore 366 of the turbine shell and radial portion 368 disposed between the turbine shell and damper plate 352. During operation of converter 300, turbine 306 may thrust in direction 370 towards cover shell 320. Thrust force from the turbine is transmitted from shell 314, through bushing 362 to plate 352, plate 324, and ring 330 to wall 322 of shell 320. This thrust path advantageously limits axial displacement of shell 314 and clutch plate 312 to control "liftoff" as described above.

Pressure in chamber 372, disposed between cover 320 and clutch plate 312 may be increased above a pressure in torus 202 to engage the clutch and bypass the torus fluid circuit. That is, torque from cover 320 transmitted to impeller 308 is directly transmitted to turbine shell 314 through plate 312 without operation of the fluid circuit. Depending on the operating condition of converter 300 prior to an attempted engagement of the clutch, imprecise control of liftoff may prevent clutch engagement due to hydrodynamic forces within the converter.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

We claim:

1. A torque converter comprising:
    a torus including an impeller and a turbine;
    an impeller shell including an impeller shell radial wall disposed radially outside of the torus;
    a turbine shell including a turbine shell radial wall arranged for frictionally engaging the impeller shell radial wall;
    a cover shell fixed to the impeller shell and including a cover shell radial wall; and,
    a first damper plate including a first damper plate radial wall for transmitting a turbine shell thrust force to the cover shell radial wall.

2. The torque converter of claim 1 further comprising a friction material ring fixedly attached to the turbine shell radial wall or the impeller shell radial wall.

3. The torque converter of claim 1 further comprising a friction material ring fixedly attached to the cover shell radial wall or the first damper plate radial wall.

4. The torque converter of claim 3 wherein the friction material ring is fixedly attached to the first damper plate radial wall and the first damper plate includes an orifice disposed radially inside of the friction material ring.

5. The torque converter of claim 1 wherein the first damper plate includes a spline portion arranged for connecting to a transmission input shaft.

6. The torque converter of claim 5 wherein the first damper plate includes a damper hub, the damper hub includes the spline portion, and the damper hub is arranged to receive the turbine shell thrust force.

7. The torque converter of claim 6 further comprising a bushing with a circumferential portion disposed within a circumferential bore of the turbine shell and a radial portion disposed between the turbine shell and the damper hub.

8. The torque converter of claim 1 further comprising a first damper spring, wherein the turbine shell includes an integrally formed drive tab extending from the turbine shell radial wall and engaged with the first damper spring.

9. The torque converter of claim 8, further comprising a second damper plate, wherein:
    the second damper plate is fixed to the first damper plate;
    the first and second damper plates include respective integrally-formed spring retainer portions; and,
    the first damper spring is disposed within the first and second damper plate spring retainer portion.

10. The torque converter of claim 9 further comprising:
    the first and second damper plates include respective first and second spring windows;
    a third damper plate including:
        a spline portion arranged for connecting to a transmission input shaft;
        a third spring window; and,
        an orifice disposed radially inside of the third spring window; and,
    a second damper spring disposed within the first, second, and third spring windows of the respective first, second, and third damper plates; wherein:
        the third damper plate is disposed between the first and second damper plates; and,
        the third damper plate is arranged for transmitting a thrust force from the turbine shell to the first damper plate.

11. The torque converter of claim 10 further comprising a bushing with a circumferential portion disposed within a circumferential bore of the turbine shell and a radial portion disposed between the turbine shell and the third damper plate.

* * * * *